United States Patent [19]

Schuler

[11] 4,379,315

[45] Apr. 5, 1983

[54] CARRIAGE LOADING ARM ASSEMBLY HAVING TWO MAGNETIC TRANSDUCERS FOR A DOUBLE SIDED FLOPPY DISC

[75] Inventor: Heinz Schuler, Ventura, Calif.

[73] Assignee: Applied Magnetics Corporation, Goleta, Calif.

[21] Appl. No.: 199,381

[22] Filed: Oct. 21, 1980

[51] Int. Cl.³ .......................... G11B 5/48; B11B 5/54; G11B 5/58; G11B 21/20
[52] U.S. Cl. .................................. 360/105; 360/103; 360/99
[58] Field of Search ................. 360/105, 104, 103, 99, 360/102, 107

[56] References Cited

U.S. PATENT DOCUMENTS

| | | | |
|---|---|---|---|
| 3,489,381 | 1/1970 | Jones et al. | 360/103 |
| 3,896,495 | 7/1975 | Beecroft | 360/103 |
| 4,151,573 | 4/1979 | Tandon et al. | 360/104 |
| 4,167,766 | 9/1979 | Chau | 360/104 |
| 4,247,877 | 1/1981 | Keller et al. | 360/104 |
| 4,306,258 | 12/1981 | Higashiyama et al. | 360/99 |

OTHER PUBLICATIONS

IBM Tech. Disc. Bull, E. L. Bailey et al., Read/Write Head Load-Unload Device, vol. 18, No. 7, Dec. 1975, pp. 2246-2247.
IBM Tech. Disc. Bull, F. K. King et al., Head Compliance System for Flexible Magnetic Disk, vol. 18, No. 12, May 1976, pp. 4112-4114.

*Primary Examiner*—Alfred H. Eddleman
*Attorney, Agent, or Firm*—Daniel J. Meaney, Jr.

[57] ABSTRACT

Apparatus for maintaining two magnetic transducers in operative relation with both sides of a rotatable flexible planar magnetic recording media is shown. The apparatus includes a carriage having a first transducer coupled to one end thereof through a differential torsion spring support means which is adapted to support the first transducer against one side of the media in a semi complaint relationship and a high degree of stiffness about two axes, one of which is radial with respect to the media and the other axis which is normal to the media, and in a fully compliant relationship with low flexure stiffness about a third axis which is circumferential with respect to the media. The apparatus includes a loading arm which is pivotally connected to the other end of the carriage and which is adapted to be movable toward and away from the other side of the media. A second transducer is coupled to the loading arm through a gimbal support means and is adapted to be positioned in engagement with the other side of the media. The gimbal support means is adapted to support the second transducer in a fully compliant relationship with low flexure stiffness with all three of the axes with respect to the media. Means are provided which are operatively coupled to the carriage and the loading arm for moving the loading arm toward the other side of a media to position the second transducer into contiguous engagement with the other side of the media and to urge the one side of the media into contiguous engagement with the first transducer such that variations inflexure of the media along the axes which are normal and radial to the media are compensated primarily by movement of the second transducer against its gimbal support means and partially by movement of the first transducer against its differential torsion spring support means and variations in flexure of the media along the third axis circumferential thereto are compensated by equal movements of each transducer against its associated support means.

15 Claims, 7 Drawing Figures

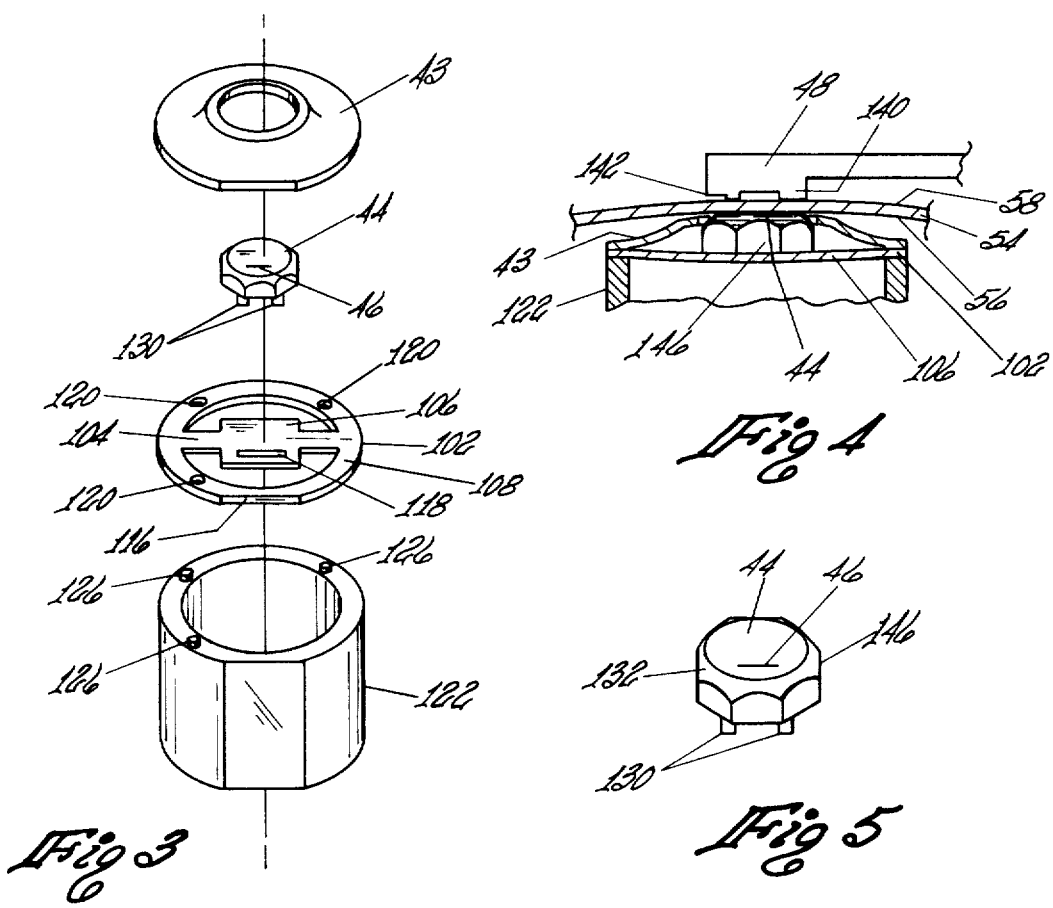

CARRIAGE LOADING ARM ASSEMBLY HAVING TWO MAGNETIC TRANSDUCERS FOR A DOUBLE SIDED FLOPPY DISC

BACKGROUND OF THE INVENTION

1. Field of the Invention

This invention relates to apparatus for maintaining two magnetic transducers in operative relation with both sides of a rotatable flexible planar magnetic recording media and more specifically relates to a carriage-loading arm assembly for maintaining two magnetic transducers in operative relationships with both sides of a double sided floppy disc.

2. Description of the Prior Art

Apparatus for maintaining two magnetic transducers in operative relation with both sides of a rotatable flexible planar magnetic recording media is known in the art.

One such apparatus disclosed in IBM Technical Disclosure Manual Volume 18, No. 7 dated December, 1975 at pages 2246 and 2247, has two pivotal, gimballed transducers, each of which are located on the ends of two swing arms. The ends of the swing arms having the gimballed transducer mounted thereon are adapted to move towards and away from the side of a double sided floppy disc positioned between the swing arms. During operation, each gimbal spring positions its respective transducer against one side of the double sided floppy disc. Variations in flexure of the disc along axes which are radial, normal and circumferential to the disc are compensated equally by movement of each transducer and its associated gimbal spring.

Another known apparatus disclosed in IBM Technical Disclosure Journal Volume 18, No. 12 dated May 1976 at pages 4112 to 4114, inclusive, utilized two fixed transducer-slider assemblies mounted on a movable carriage which position the transducers relative to each side of a rotatable double sided floppy disc within the interior of a close fitting envelope. Air bearings exist between each transducer-slider assembly and its associated side of the disc.

Another known apparatus for supporting two magnetic transducers in operative relationship with both sides of a floppy disc is disclosed in U.S. Pat. No. 4,151,573 to Tandem. In the carriage-loading arm assembly disclosed in U.S. Pat. No. 4,151,573, a carriage has a first transducer fixedly mounted at one end thereof and a loading arm pivotally attached to the other end thereof. A second transducer is mounted to the other end of the loading arm thereof through a gimbal spring. The loading arm is adapted to be moved toward the media and to preload the gimballed transducer against the media and the transducer fixedly mounted on the carriage which serves as a positional reference. Variations in flexure of the disc rotated between the fixed transducer and the gimballed transducer are compensated solely by movement of the second transducer and its associated gimbal spring along the axes which are radial, normal and circumferential with respect to the disc.

A double sided flexible disc head assembly has been developed wherein the fixed transducer disclosed in Tandem U.S. Pat. No. 4,151,573 is mounted with a Z-axis suspension to allow vertical displacement in an axis normal to the disc to compensate for variations in flexure in the disc. One such assembly is offered for sale and sold by Nortronics Company, Inc. of Minneapolis, Minnesota as a double sided flexible disc head assembly incorporating Z-axis suspension.

SUMMARY OF THE INVENTION

The present invention relates to a novel, unique and improved apparatus for maintaining two magnetic transducers in operative relation with both sides of a rotatable flexible planar magnetic recording media. In the preferred embodiment, the apparatus is adapted to be utilized in a carriage-loading arm assembly which maintains two magnetic transducers in operative relation with two sides of a double sided floppy disc.

The apparatus includes a first transducer which is coupled to a first end of the carriage through a differential torsion spring support means. The second end of the carriage is adapted to be operatively coupled to an accessing mechanism. The carriage when accessed is adapted, to position the first transducer in different transfer data positions relative to and in engagement with one side of the media. The differential torsion spring support means is adapted to support the first transducer against the one side of the media in a semi-compliant relationship with high flexure stiffness about two axes, one of which is radial with respect to the media and the other of which is normal to the media. In addition, the differential torsion spring support means supports the first transducer in a fully compliant relationship with low flexure stiffness about a third axis which is circumferential with respect to the media. A loading arm having a first end and a second end with a first end thereof being pivotally connected to the second end of the carriage is provided. The loading arm is positioned relative to the other side of the media and is adapted to have its second end movable towards and away from the other side of the media. A second transducer is coupled to the second end of the loading arm through a gimbal support means. The loading arm is adapted to position the second transducer in different data transfer positions relative to and in engagement with the other side of the media. The gimbal support means is adapted to support the second transducer in a fully compliant relationship with low flexure stiffness about all three of radial, normal and circumferential axes with respect to the media.

The apparatus includes means operatively coupled to the carriage and to the loading arm for moving the free end of the loading arm toward the other side of the media to position the second transducer into contiguous engagement with the other side of the media and to urge the media into contiguous engagement with the first transducer positioning the media in close operative relationship therebetween. The first transducer and the second transducer are responsive to the media being rotated therebetween such that variations in the flexure of the media along the two axes which are radial and normal to the media are compensated primarily by movement of the second transducer against gimbal support means and partially by movement of the first transducer against its differential torsion spring support means and variations in flexure of the media along the third axis circumferential the media are compensated by equal movements of each transducer against its associated support means thereby maintaining contact between each side of the media and its respective transducer.

The apparatus of the present invention overcomes certain disadvantages and problems associated with the prior art apparatus.

In the apparatus disclosed in the IBM Technical Disclosure Bulletin Volume 18, No. 7 dated December, 1975, the two transducers, each of which are mounted to the ends of swing arms through a gimbal support means, do not maintain transducer/media contact during rotation of the media and results in lost spacing between the media and the transducer in response to variations in flexure of the media between the transducers and their associated swing arms.

The apparatus disclosed in IBM Technical Disclosure Bulletin Volume 18, No. 12 dated May, 1976, does not provide means for loading a double sided floppy disc between the carriage having two fixed transducer-slider assemblies. The transducer-slider assemblies are adapted to be inserted into a disc cartridge or diskette between the envelope and sides of the floppy disc. Also, the transducer is part of a transducer-slider assembly for flying head on an air bearing and, as such, the fixed transducers are not in contiguous engagement with the sides of the disc.

The apparatus disclosed in Tandem U.S. Pat. No. 4,151,573, has a transducer fixedly mounted on one end of the carriage and a gimballed transducer mounted on one end of a loading arm. As such, variations in flexure of a disc rotated between the fixed transducer and the gimballed transducer requires that the gimballed transducer be sufficiently loaded against the fixed referenced transducer to maintain intimate transducer/media contact to avoid spacing loss therebetween due to variations of the pliant media. A loading force is required above the axis normal to the media. Use of a loading force to maintain transducer/media contact results in higher transducer wear since one transducer is fixed and the other transducer, through its gimbal spring mounting means compensates for variations in flexure of the media in all three axes which are radial, normal and circumferential to the media. Lower transducer/media wear occurs when both transducers are moved in one or more of all the axes in both sides of the disc.

The present invention provides a novel and unique carriage-loading arm assembly wherein a carriage has a first transducer mounted on a first end thereon through a differential torsion spring support means such that the first transducer is supported against one side of the media in a semi-compliant relationship with a high flexure stiffness with about two axes, one of which is radial to the media and the other which is normal to the media. Concurrently the differential torsion spring support means supports the first transducer in a fully compliant relationship with low flexure stiffness about the third axis which is circumferential with respect to the media. In addition, the loading arm at its second end supports the second transducer in a fully compliant relationship with low flexure stiffness in all three of the axes with respect to the media.

By utilizing the teachings of the present invention, a carriage-loading arm assembly is adapted to have a double sided floppy disc inserted therebetween and the loading arm utilized to pre load the disc against the transducer. In operation, the loading arm is moved toward the media urging the second transducer, supported by the gimbal support means against the media which loads the media against the first transducer mounted on the first end of the carriage. In loading the second transducer located at the second end of the loading arm against the media and urging the media against the first transducer located on the end of the carriage, the first transducer supported by the differential torsion spring support means is slightly deflected along the axis which is normal to the disc. Since the first transducer on the carriage is supported by the differential torsion spring support means which is semi-compliant with a high flexure stiffness along the axis normal to the media, movement of the first transducer in the axis normal to the media in response to the loading of the second transducer on the loading arm thereagainst results in reduced transducer wear due to the movement of both transducers through their associated support means relative to the media during rotation of the media therebetween.

Another advantage of the present invention is that a diskette ramp loading shield is positioned in spaced relationship relative to the movable transducer supported by the differential torsion spring support means on the carriage to receive and deflect the envelope of a diskette containing the double sided floppy disc during loading thereof to insure that the first transducer supported by the differential torsion spring support means is positioned relative to one opening in the diskette envelope.

Yet another advantage of the present invention is that the a differential torsion spring support means, exhibits characteristics which can be characterized as being semi-compliant with a high flexure stiffness along two axes, one of which is radial with respect to the disc and the other which is normal to the disc. In addition, the differential torsion spring support means is fully compliant with low flexure stiffness about a third axis which is circumferential with respect to the media.

A further advantage of the present invention is that the transducer and its associated gimbal support means located on the second end of the loading arm can be fully compliant with low flexure stiffness about all three of the axes such that when the second transducer located on the loading arm is positioned in opposed operative relationship with the media and with the first transducer located on the first end of the carriage, both transducers are responsive to variations in flexure of the disc during rotation of the disc, variations in flexure of the disc along two axes which are radial and normal to the disc are compensated primarily by movement of the second transducer against its gimbal support means and partially by movement of the first transducer against its differential torsion spring support means. Variations in flexure of the disc along the third axis, which is circumferential to the disc, is compensated by equal movements of each transducer against its associated support means. By using this arrangement, the transducers and their associated support means are adapted to cooperate with the disc such that contiguous engagement is maintained between each side of the media and its respective transducer thereby avoiding loose spacing between the transducer and the media.

A yet further advantage of the present invention is that a diskette ramp shield is provided which surrounds the independently supported first transducer and which receives and deflects the edge of a diskette as it is loaded in the carriage-loading arm assembly.

A still yet further advantage of the present invention is that the carriage-loading arm assembly, with the two transducers being supported by their associated support means, can be interchangeable with known carriage-loading arm assemblies adapted for use with double sided floppy discs drives.

BRIEF DESCRIPTION OF THE DRAWINGS

These and other objects and advantages of the invention, together with its various features and advantages, can be more easily understood from the following more detailed description of the preferred embodiment taken in conjunction with the accompanying drawing in which:

FIG. 3 is an exploded view showing the various components of a transducer/differential torsion spring assembly mounted within a support housing;

FIG. 4 is a pictorial representation partially in cross section, illustrating the relationship between a first transducer supported by a differential torsion spring support means and a second transducer supported by gimballed support means;

FIG. 5 is an isometric view of the first transducer which is adapted to be supported by the differential torsion spring as illustrated in FIG. 3;

FIG. 6 is a top planar view of a differential torsion spring support means having a central support member for mounting a first transducer to the first end of a carriage; and FIG. 7 is a sectional view of a differential torsion spring support means taken along section lines 7—7 of FIG. 6.

DESCRIPTION OF THE PREFERRED EMBODIMENT

Figure 1:
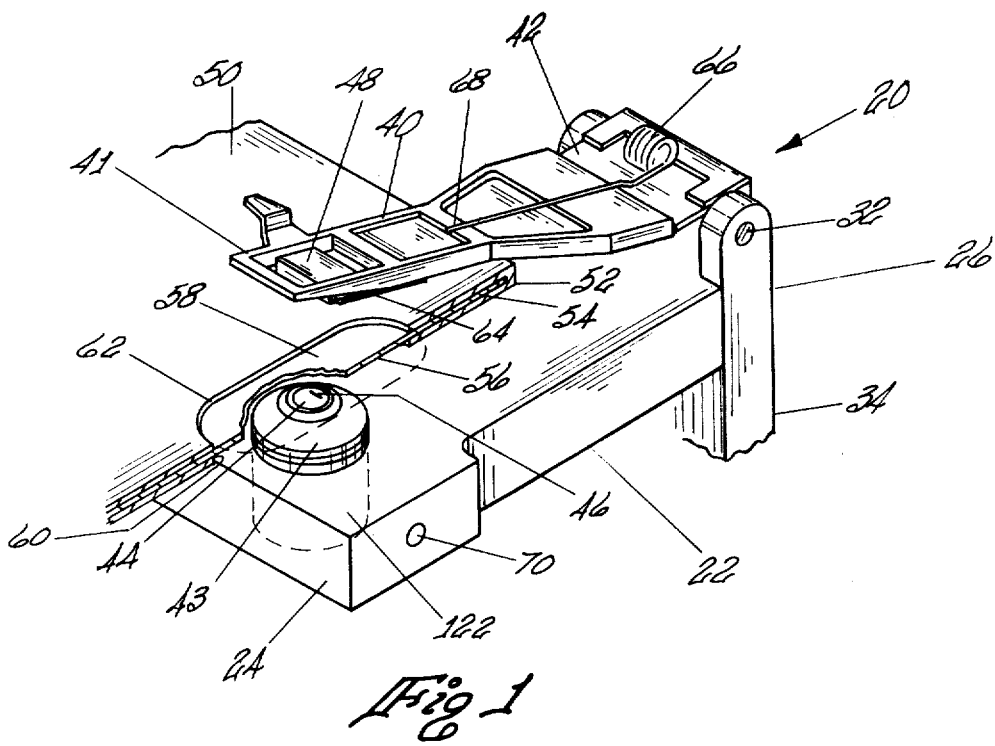
FIG. 1 is a perspective view of a carriage-loading arm assembly positioned relative to a diskette having a double sided floppy disc.

FIG. 1 shows the apparatus for maintaining two magnetic transducers in operative relation with both sides of a rotatable flexible planar recording media generally by arrow 20. In the preferred embodiment, the apparatus is in the form of a carriage-loading arm mechanism which includes a carriage 22 having a first end 24 and a second end 26. A loading arm 40 has a first end 41 and a second end 42 with the second end 42 being pivotally connected to the second end 26 of the carriage 22 through a pin member 32.

Figure 2:
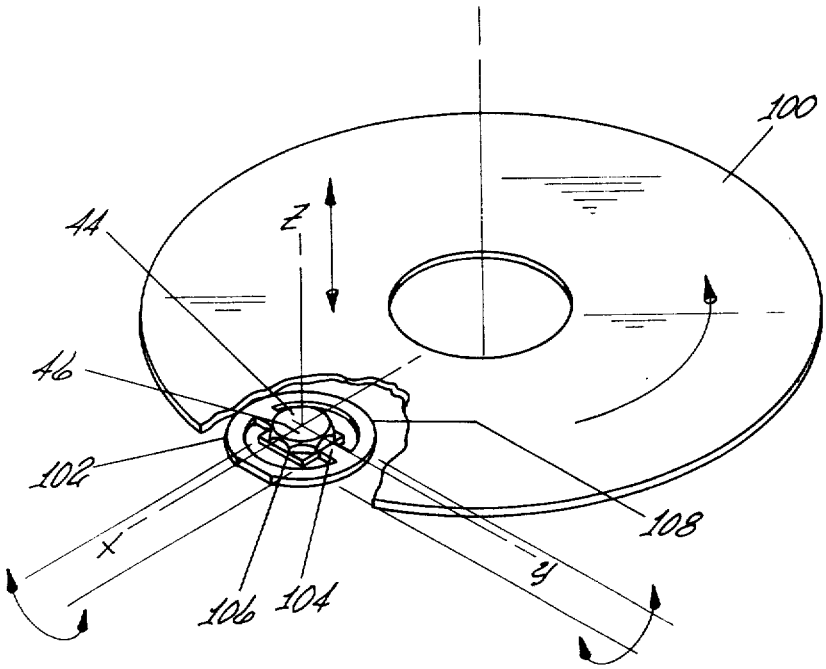
FIG. 2 is a perspective pictorial view illustrating the position of a first transducer mounted on a differential torsion spring support means relative to the axes of a disc which axes are radial, normal and circumferential to a double sided floppy disc.

A first transducer 44 is coupled to the first end 24 of the carriage 22 through a differential torsion spring support means, shown as spring 102 in FIG. 2.

The first transducer 44 is enclosed by a ramp shield 43 which is adapted to receive and deflect the edge of a diskette 50 during insertion thereof between the carriage 22 and the loading arm 40. The diskette 50 includes an envelope 52 and a double sided floppy disc 54 having a first side 56 and a second side 58. The envelope 52 includes opening 60 adjacent one side 56 and a second opening 62 adjacent the other side 58. The opening 60 provides means for the first transducer 44 to be positioned in different data transfer positions relative to and in engagement with the one side 56 of the media 54.

A second transducer 48 is coupled to the second end 41 of the loading arm 40 through a gimbal support means 64. The loading arm 40 is adapted to position the second transducer 48 in different data transfer positions relative to and in engagement with the other side 58 of the media 54 through opening 62. The gimball support means 64 is adapted to support the second transducer 48 in a fully compliant relationship with low flexure stiffness about three axes with respect to the disc 54 which are radial, normal and circumferential to the disc.

The first transducer 44 and the ramp shield 43 are supported by a transducer housing shown by dash lines 122 in FIG. 1 and which is illustrated in greater detail in FIG. 3. The housing is held in the first end 24 of the carriage 22 by means of a holding fastener 70.

FIG. 2 illustrates in greater detail the relationship between the first transducer 44 relative to a rotatable flexible planar magnetic recording media or disc 100. In the preferred embodiment, the first transducer 44 is mounted on a differential torsion spring support means 102 such that the transducing gap 46 is circumferential with respect to the disc 100. The differential torsion spring support means 102 is adapted to support the first transducer 44 against one side of the media 100 in a semi-compliant relationship with high flexure stiffness about two axes, one of which is radial with respect to the media 100, that axis being shown as axis "X", and the other of which is normal to the media 100 and which is shown in FIG. 2 as axis "Z". In addition, the differential torsion spring support means 102 supports the transducer 44 in a fully compliant relationship with low flexure stiffness about a third axis which is circumferential with respect to the media 100, that axis being shown as axis "Y".

As illustrated in FIG. 2, the differential torsion spring support means 102 has an annular shaped outer ring 108, a central support member 104 which extends through the diameter of the annular shaped outer ring 108 and a flat planar base 106 which is located intermediate the central support member 104. The planar base 106 is adapted to receive and support the first transducer 44. As illustrated in FIG. 2, the first transducer and planar base 106 can be deflected in the "Z" axis due to the resiliency of the central support member 104. The resiliency in the "Z" axis is characterized as being semi-compliant with high flexure stiffness in an axis which is normal with respect to the media.

The movement of the differential torsion spring central support member 104 in the "X" direction depends upon the resiliency characteristic of the central support member 104 in the "X" direction and this is characterized likewise as being a semi-compliant relationship with high flexure stiffness about an axis which is radial with respect to the media.

The transducer 44, the planar base 106 and the central support member 104 is adapted to be rotatable around the "Y" axis. This is characterized as being a fully compliant relationship with a low flexure stiffness about a third axis which is circumferential with respect to the media. This axis is shown as axis "Y" in FIG. 2.

Referring again to FIG. 1, means are operatively coupled to the carriage 22 and the loading arm 42 which, in the preferred embodiment, is a loading spring 66 having an elongated arm 68, which functions to position the second transducer 48 into contiguous engagement with the other side 58 of the disc 54. Thus, the floppy disc 54 is positioned in close operative relationship between the first transducer 44 and the second transducer 48. The first transducer 44 and second transducer 48 are responsive to the disc 54 being rotated therebetween such that variations in the flexure of the disc 54 along the "X" axis which is radial to the disc 54 and along the "Z" axis which is normal to the disc 54, are compensated primarily mainly by movement of the second transducer 48 against its gimbal support means 64 and partially by movement of the first transducer 44 against its differential torsion spring support means 102. In addition, variations in flexure of the disc 54 along the third or "Y" axis circumferential to the disc 54, are compensated by equal movements of each transducer 44 and 48 against its support means to maintain contiguous engagement between each sides of the media 56 and 58 relative to transducers 44 and 48.

FIG. 3 illustrates the various components which are utilized to mount the first transducer 44 and the differential torsion spring support means 102 within the first end 24 of the carriage 22. A housing 122 has a plurality of alignment pins 126 extending from one thereof which are adapted to receive, align and support the differential torsion spring support means 102.

The differential torsion spring support means 102 includes a plurality of apertures 120 which are adapted to receive and be aligned by pins 126 extending from housing 122. The planar base 106 of the differential torsion spring support means 108 has an elongated slot 118 formed therein which is adapted to receive tabs 130 which extend from the under surface of transducer 44 which is opposed to the surface forming the transducing surface which is adapted to contiguously engage the media. The ramp shield 43 is adapted to be mounted on the extended pins 126 and is secured to the housing 122 by an epoxy adhesive. The edge of transducer 44 is spaced from the inner surface of the aperture in the ramp shield 43 to permit independent movement of the transducer 44 in the radial, normal and circumferential axes.

FIG. 4 shows in greater detail the relationship between the first transducer 44, the second transducer 48 and the disc 54. The housing 122 supports the differential torsion spring support means 102 with the central support member 104 extending therebetween which receives and supports the first transducer 44. The ramp shield 43 is illustrated to be assembled relative to the differential torsion spring support means 102 and the first transducer 44 such that the first transducer surface slightly extends or protrudes beyond the edge of the ramp shield 43 to insure intimate contact by the slightly protruding transducer 44 with the disc 54. The second transducer 48 is adapted to be loaded against the first transducer 44 in order to position the media in operative relationship therebetween. When the second transducer 48 is urged into contiguous engagement with the other side 58 of the media 54, the transducing gap 142 in the second transducer 48 is positioned in transducing relationship with side 58. A slider 140 is adapted to engage and hold the media 54 in a substantially flat rigid relationship against the concave surface of the protruding first transducer 44. When the second transducer 48 is positioned in contiguous engagement with the side 58 of the disc 54, the second transducer 48 urges disc 52 and side 56 thereof into contiguous engagement with the transducer 44. A loading force is exerted against the surface of head 44 along the "Z" axis which then causes the central support member 104 of the differential torsion spring support means 102 to deform slightly in the "Z" direction which is essentially a semi-compliant relationship having a high flexure stiffness.

As the disc 54 is rotated about its axis which moves the sides 56 and 58 past the first transducer 44 and the second transducer 48, respectively, portion of the disc located between the transducers 44 and 48 is held in a somewhat rigid manner to afford some stiffness to the media to permit the transducing action to occur between both sides of the media. Variations in flexure of the media along the "Z" axis which is the axis normal to the surface of the disc 54 are compensated primarily by movements of the first transducer 48 along the "Z" axis and partially by movement of transducer 44 due to the flexure of central support member 104 to permit slight movements of first transducer 44 along the "Z" axis.

FIG. 5 illustrates one embodiment of a first transducer which is adapted to be utilized in practicing this invention. The transducer 44 has a transducing gap 46 located in a plano-concave surface formed in transducer 44. Rounded edges 132 extend from the edge of the plano-concave surface forming the transducer surface which provides means for the edge of the transducer 44 to terminate underneath the edge of the diskette ramp shield 43 as illustrated in FIG. 4. Tabs 130, which are adapted to pass through elongated slot 118 illustrated in FIGS. 3 and 6, are adapted to have electrical conductors connected thereto for the conduction of electric signals to and from the transducer 44 to electronics located remotely from the carriage-loading arm assembly.

FIGS. 6 and 7 illustrate in greater detail the specific construction of one embodiment of a differential torsion spring support which can be utilized in practicing the invention. In the preferred embodiment, the differential torsion spring 102 has an annular ring 108 which has a flat edge 116 formed on one portion thereof which is adapted to correspond to a flat portion formed on the housing 122. The planar base 106 has a geometrical width and length which is approximately equal to the radius of the annular member 108. The elongated slot 118 extends substantially parallel to the central support member 104.

In the preferred embodiment, the differential torsion support spring is formed of type 304 stainless steel, is approximately 0.004 inches in thickness and approximately 0.035 inches in width. The spring stiffness along the "X" axis is a 6300 ft/lbs per inch; along the "Y" axis is approximately 68,000 ft/lbs per inch and along the "Z" axis approximately 82 ft/lbs per inch. About the roll axis the stiffness is approximately 0.128 inches-ft/lbs per radian; about the pitch axis 1.73 inches-ft/lbs per radian and about the yaw axis is approximately is approximately 132 inch-ft/lbs per radian. In the preferred embodiment, natural resonant frequencies (undamped) along the "Z" axis are approximately 1060 hertz; along the "Y" axis 30,400 hertz; along the "X" axis 9,270 hertz; about the roll axis 750 hertz, about the pitch axis 2,770 hertz and about the yaw axis 14,500 hertz.

In the preferred embodiment the first transducer is adapted to be utilized in a 96 track per inch double sided floppy disc installation. From the standpoint of diskette wear, the loading between the second transducer relative to the first transducer is approximately 14±1 gram which reduces the transducer head/ to media wear.

The deflection of the transducer along the "X" axis, which is normal to the media, is approximately 0.0012 inch after loading of the second transducer thereagainst. In the preferred embodiment, the transducer surface protrudes beyond the map load shield approximately 0.0008 inches to about 0.0019 inches.

The carriage-loading arm assembly has utility in double sided floppy disc applications. The design of the carriage-loading arm assembly is such that it is interchangeable with such assemblies utilized by a number of manufacturers in double sided diskette drive assemblies. In addition, the carriage-loading arm assembly can be utilized with higher density floppy disc recording systems by utilizing a transducer which has higher track per inch recording and reproducing capability and higher density applications.

In the preferred embodiment, the carriage-loading arm assembly includes two transducers, at least one of which is operatively coupled to the end of at least one of the carriage and loading arm through a differential torsion spring support means. In the preferred embodiment disclosed herein, a gimbal support means is utilized to operatively couple a transducer to the loading arm. However, it is envisioned that such transducer could be operatively coupled to the loading arm by support means other than a gimbal support means. For example, it is envisioned that a differential torsion spring support means could likewise be utilized in lieu of a gimbal support means to operatively couple a transducer to the end of a loading arm.

Further, depending upon the design and application of a carriage-loading arm assembly or its associated disc drive, a differential torsion spring support means could be utilized as the means for operatively coupling the one transducer to the end of the loading arm and a gimbal support means utilized for operatively coupling the other transducer to the end of the carriage. It is acknowledged, however, that the present design and applications utilize a carriage-loading arm assembly of the preferred embodiment.

What is claimed is:

1. Apparatus for maintaining two magnetic transducers in operative relation with both sides of a rotatable flexible planar magnetic recording media comprising
   a carriage having a first end and a second end;
   a first transducer coupled to said first end of the carriage through a differential torsion spring support means, said carriage being adapted to position said first transducer in different data transfer positions relative to and in engagement with one side of a said media, said differential torsion spring support means being adapted to support said first transducer against the one side of a said media in a semi-compliant relationship with high flexure stiffness about two axes, one of which is radial with respect to a said media and the other of which is normal to a said media and in a fully compliant relationship with low flexure stiffness about a third axis which is circumferential with respect to a said media;
   a loading arm having a first end and a second end with said first end being pivotally connected to said second end of the carriage, said loading arm being positioned relative to the other side of a said media and adapted to have its second end movable toward and away from the other side of a said media;
   a second transducer coupled to said second end of the loading arm through a gimbal support means, said loading arm being adapted to position said second transducer in different data transfer positions relative to and in engagement with the other side of said media, said gimbal support means being adapted to support said second transducer in a fully compliant relationship with low flexure stiffness about all three of the axes with respect a said media; and
   means operatively coupled to said carriage and said loading arm for moving said second end of the loading arm toward the other side of said media to position said second transducer into contiguous engagement with the other side of a said media and to urge a said media into contiguous engagement with the first transducer positioning a said media in close operative relationship therebetween, said first transducer and said second transducer being responsive to a said media being rotated therebetween such that the variations in flexure of a said media along the axes which are radial and normal to a said media are compensated primarily by movement of the second transducer against its gimbal support means and partially by movement of the first transducer against its differential torsion spring support means and variations in flexure of a said media along the third axis circumferential thereto are compensated by movements of each transducer against its associated supported means to maintain contiguous engagement between each said of a said media and its respective transducer.

2. The apparatus of claim 1 further comprising
   a ramp shield positioned at the first end of the carriage assembly and adapted to enclose the first transducer to permit independent movement of the first transducer along axes which are normal, radial and circumferential to the media.

3. The apparatus of claim 1 wherein the differential torsion spring support means comprises:
   an annular shaped member;
   a central support member which extends across the diameter of the annular shaped member; and
   a base plate located intermediate the central support member and having an elongated slot formed therein which extends in a spaced parallel relationship to the central support member.

4. The apparatus of claim 3 wherein said first transducer includes tabs extending from the surface thereof which is opposite to the surface adapted to be positioned in contiguous engagement with one side of a media and wherein said tabs are adapted to be inserted into and passed through the elongated slot.

5. The apparatus of claim 3 wherein said differential torsion spring support means has a plurality of alignment apertures formed through the annular shaped member and further comprising
   a housing having a hollowed out central area and a plurality of alignment pins extending from one end thereof, said alignment pins being adapted to pass through the alignmemt apertures in the annular shaped ring of the differential torsion spring support means to support the differential torsion spring support means and the said first transducer mounted thereon for movements along axes which are radial, normal and circumferential to the media.

6. The apparatus of claim 5 wherein said differential torsion spring support means is formed of type 304 stainless steel.

7. The apparatus of claim 6 wherein said central support member of the differential torsion spring support means is deflected approximately 0.001 inch in a plane normal to the media when the second transducer is loaded against the first transducer having the media located therebetween.

8. The apparatus of claim 2 wherein said means for urging said loading arm toward and away from said media is a spring.

9. A carriage-loading arm assembly for maintaining two magnetic transducers in operative relation with both sides of a double sided floppy disc comprising a first transducer coupled to one end of the carriage through a differential torsion spring support means wherein said carriage is adapted to position said first transducer in different data transfer positions relative to and in engagement with one side of a said disc, said differential torsion spring support means being adapted to support said first transducer against the one side of a said disc in a semi-compliant relationship with high flexure stiffness about two axes, one of which is radial with respect to a said disc and the other of which is normal to a said disc and in a fully compliant relationship with low flexure stiffness about a third axis which is circumferential with respect to a said disc;

a second transducer coupled to one end of the loading arm through a gimbal support means wherein said loading arm is adapted to position said second transducer in different data transfer positions relative to and in engagement with the other side of said disc, said gimbal support means being adapted to support said second transducer in a fully compliant relationship with low flexure stiffness about all three of the axes with respect to a said disc; and means operatively coupled to said carriage and said loading arm for moving said loading arm having said second transducer mounted thereon toward the other side of a said disc to position said second transducer into contiguous engagement with the other side of a said disc and to urge a said disc into contiguous engagement with the first transducer positioning a said disc in close operative relationship therebetween enabling said first transducer and said second transducer to be responsive to a said disc being rotated therebetween such that the variations in flexure thereof along axes which are radial and normal to a said disc are compensated primarily by movement of the second transducer against its gimbal support means and partially by movement of the first transducer against its differential torsion spring support means and variations in flexure of a said disc along the third axis circumferential thereto and compensated by movements of each transducer against its associated support means.

10. The carriage-loading arm assembly of claim 9 further comprising a ramp shield enclosing the first transducer to permit the first transducer to slightly protrude therethrough into engagement with one side of a said disc and to permit independent movement of the first transducer along the axes which are normal, radial and circumferential to the disc.

11. The carriage-loading arm assembly of claim 10 wherein the differential torsion spring support means comprises:

an annular shaped member;

a central support member which extends across the diameter of the annular shaped member; and a base plate located intermediate the central support member and having a spaced elongated slot which is parallel to the central support member formed therein.

12. In combination, a first transducer having a plano-concave surface which is adapted to be positioned in operative engagement with the one side of a rotatable flexible planar magnetic recording media;

a differential torsion spring support means operatively coupled to said first transducer and being adapted to support said first transducer against one side of a said media in a semi-compliant relationship with high flexure stiffness about two axes, one of which is radial with respect to a said media and the other of which is normal to a said media and in a fully compliant relationship with a low flexure stiffness about a third axis which is circumferential with respect to a said media;

a second transducer having a slider contact surface which is adapted to be positioned in operative engagement with the other side of a said media;

a gimbal support means operatively coupled to said second transducer and being adapted to support said second transducer in a fully compliant relationship with low flexure stiffness about all three of the axes with respect to a said media;

and a carriage-loading arm assembly which is adapted to have a said flexible planar magnetic recording media positioned between the carriage and loading arm assembly and wherein the carriage is adapted to be driven radially relative to the one side of a said media and wherein said loading arm is pivotally connected to said carriage and includes means for moving said loading arm toward and away from the other side of said media, said carriage having said first transducer and said differential torsion spring support means mounted thereon wherein said carriage is adapted to position said first transducer in different data transfer positions relative to and in engagement with said one side of said media, said loading-arm assembly having said second transducer and said gimbal support means mounted thereso wherein said loading arm is adapted to position said second transducer in different data transfer positions relative to and in engagement with said other side of a said media.

13. The combination of claim 12 wherein said differential torsion spring support means includes an annular shaped member;

a central support member which extends across the diameter of the annular shaped member; and a base plate located intermediate the central support member and having an elongated slot formed therein which extends in a spaced parallel relationship to the central support member.

14. A carriage-loading arm assembly for maintaining two magnetic transducers in operative relation with both sides of a double sided floppy disc, the loading arm having one of the two transducers operatively coupled to one end thereof and wherein the loading arm is adapted to position the one of the two transducers in different data transfer positions relative to and in engagement with a selected side of the disc and the other of the two transducers being operatively coupled to one end of the carriage and wherein the carriage is adapted to position the other of the two transducers in different data transfer positions relative to and in engagement with the other side of the disc opposite to the selected side and means operatively coupled to the carriage and the loading arm for moving the loading arm having the one of the two transducers mounted thereon toward the selected side of the disc to position the one transducer into contiguous engagement with the selected side of the disc and to position the other of the two transducers into operative relationship with the other side of the disc, the carriage-loading arm assembly comprising at least one differential torsion spring support means for operatively coupling at least one of the two transducers to at least one of the carriage and the loading arm, said differential torsion spring support means being adapted to support said at least one of the two transducers against its associated side of a said disc in a semi-compliant relationship with high flexure stiffness about two axes, one of which is radial with respect to a said disc and the other of which is normal to a said disc and in a fully compliant relationship with low flexure stiffness about a third axis which is circumferential with respect to a said disc.

15. The carriage-loading arm assembly of claim 14 wherein the other of the two transducers is operatively coupled to the carriage by said differential torsion spring means and wherein the one of the two transducers is operatively coupled to the loading arm by a gimbal support means.

* * * * *